United States Patent
Krogh

(10) Patent No.: US 12,502,083 B2
(45) Date of Patent: Dec. 23, 2025

(54) ESTIMATING A VALUE ASSOCIATED WITH HEART WALL TENSION

(71) Applicant: Cardiaccs AS, Oslo (NO)

(72) Inventor: Magnus Reinsfelt Krogh, Lier (NO)

(73) Assignee: CARDIACCS AS, Oslo (NO)

( * ) Notice: Subject to any disclaimer, the term of this patent is extended or adjusted under 35 U.S.C. 154(b) by 380 days.

(21) Appl. No.: 17/781,169

(22) PCT Filed: Dec. 2, 2020

(86) PCT No.: PCT/EP2020/084306
§ 371 (c)(1),
(2) Date: May 31, 2022

(87) PCT Pub. No.: WO2021/110761
PCT Pub. Date: Jun. 10, 2021

(65) Prior Publication Data
US 2023/0000366 A1 Jan. 5, 2023

(30) Foreign Application Priority Data

Dec. 2, 2019 (GB) ...................... 1917582

(51) Int. Cl.
*A61B 5/029* (2006.01)
*A61B 5/00* (2006.01)
*A61B 5/02* (2006.01)

(52) U.S. Cl.
CPC .......... *A61B 5/02028* (2013.01); *A61B 5/029* (2013.01); *A61B 5/686* (2013.01); *A61B 2562/0219* (2013.01)

(58) Field of Classification Search
None
See application file for complete search history.

(56) References Cited

U.S. PATENT DOCUMENTS

| 5,003,982 A | 4/1991 | Halperin |
| 5,840,028 A | 11/1998 | Chubachi et al. |

(Continued)

FOREIGN PATENT DOCUMENTS

| GB | 2565583 A | 2/2019 |
| JP | 2011-509123 A | 3/2011 |
| WO | WO 2009/089183 A1 | 7/2009 |

OTHER PUBLICATIONS

Halvorsen et al., "Feasibility of a three-axis epicardial accelerometer in detecting myocardial ischemia in cardiac surgical patients," J Thorac Cardiovasc Surg. Dec. 2008, 36:1496-1502 (7 pages), PubMed PMID: 19114197.

(Continued)

*Primary Examiner* — Ankit D Tejani
(74) *Attorney, Agent, or Firm* — Sterne, Kessler, Goldstein & Fox P.L.L.C.

(57) ABSTRACT

A method of estimating a value associated with heart wall tension. The method comprises: using motion data recorded with a sensor in communication with the heart to identify motion in the heart; and estimating a value associated with heart wall tension based on the identified motion in the heart. The motion in the heart that forms the basis of the estimation may be a vibration in the heart wall. A heat monitoring system for carrying out the method of estimating a value associated with heart wall tension comprises a sensor configured to be placed in communication with the heart in order to identify motion in the heart; and a data processing device arranged to receive motion data from the sensor and to then carry out the steps of the method.

21 Claims, 8 Drawing Sheets

(56) References Cited

U.S. PATENT DOCUMENTS

| | | | |
|---|---|---|---|
| 2003/0100925 | A1 | 5/2003 | Pape et al. |
| 2004/0127798 | A1 | 7/2004 | Dala-Krishna et al. |
| 2006/0178586 | A1 | 8/2006 | Dobak, III |
| 2008/0021336 | A1* | 1/2008 | Dobak, III .......... A61B 5/1102 600/508 |
| 2008/0081997 | A1 | 4/2008 | Kakihara |
| 2008/0281214 | A1 | 11/2008 | Elle et al. |
| 2009/0318995 | A1 | 12/2009 | Keel et al. |
| 2010/0022900 | A1 | 1/2010 | Peterson et al. |
| 2010/0099994 | A1 | 4/2010 | Holmstroem et al. |
| 2012/0165674 | A1 | 6/2012 | Abe et al. |
| 2014/0121549 | A1 | 5/2014 | Claus et al. |
| 2015/0018684 | A1 | 1/2015 | Abe et al. |
| 2015/0327790 | A1* | 11/2015 | Ushiroda .......... A61B 5/35 600/518 |
| 2016/0140707 | A1 | 5/2016 | Abe et al. |
| 2017/0215807 | A1 | 8/2017 | Lundback et al. |
| 2018/0361141 | A1 | 12/2018 | Fosse et al. |

OTHER PUBLICATIONS

Halvorsen et al., "Automatic real-time detection of myocardial ischemia by epicardial accelerometer," J Thorac Cardiovasc Surg., Apr. 2010, 4:1026-1032 (7 pages), Epub Aug. 29, 2009, PubMed PMID: 19717169.

Espinoza et al., "Automated detection of myocardial ischaemia by epicardial miniatureultrasound transducers—a novel tool for patient monitoring during cardiac surgery," Eur J Cardiothorac Surg., 2011, 53-59 (7 pages), Epub Jun. 2, 2010, PubMed PMID: 20627751.

Remme et al., "Validation of cardiac accelerometer sensor measurements," Physiol Meas., 2009 30:1429-1444 (17 pages). Epub Nov. 12, 2009, PubMed PMID: 19907074.

Espinoza et al., "Detecting myocardial ischaemia using miniature ultrasonic transducers—a feasibility study in a porcine model," Eur J Cardiothorac Surg., 2010 37:119-126 (8 pages), Epub Jul. 5, 2009, PubMed PMID: 19581103.

Halvorsen et al., "Skulstad H, EdvardsenT, Fosse E. Detection of myocardial ischaemia by epicardial accelerometers in the pig," Br. Jnl. Anaesth. 2009; 102:29-37 (9 pages), Epub Nov. 19, 2008, PubMed PMID: 19022793.

Elle et al., "Early recognition of regional cardiac ischemia using a 3-axis accelerometer sensor," Physiol Meas. 2005;26:429-440 (13 pages), Epub Apr. 15, 2005, PubMed PMID: 15886438.

Imenes et al., "Assembly and packaging of a three-axis micro accelerometer used for detection of heart infarction," Biomed Microdevices. 2007;9:951-957 (7 pages), PubMed PMID: 17492383.

Hoff et al., "Measurements of heart motion using accelerometers," Conf. Proc. IEEE Eng. Med. Biol. Soc. 2004; pp. 2049-2051 (3 pages), PubMed PMID: 17272122.

Hoff L, Imenes K, Fleischer LA, Halvorsen PS, Espinoza A, Remme EW, Elle OJ, Fosse E. Microsensors for Continuous Monitoring of Heart Function, Body Nets Sep. 2010 proceedings, pp. 117-123 (7 pages).

Remme et al., "Simulation model of cardiac three dimensional accelerometer measurements," Medical Engineering and Physics 2012; 34: 990-998 (9 pages).

Espinoza et al., "Effects of therapeutic hypothermia on left ventricular function assessed by ultrasound imaging," Jnl. Am. Soc. Echocardiology, Nov. 2013, pp. 1353-1363, ASE-5357R1, (11 pages).

Hyler et al., "Left ventricular function can be continuously monitored with an epicardially attached accelerometer sensor," European Journal of Cardio-Thoracic Surgery 46, 2014, pp. 313-320 (8 pages).

Grymyr et al., "A Three Dimensional Accelerometer can Monitor Left Ventricular Function Independent of Sensor Alignment with the Cardiac Coordinate Axes," Abstract: Cardiovascular Imag. Mar. 28, 2018 (1 page).

International Search Report mailed Mar. 4, 2021 for Appl. No. PCT/EP2020/084306, 4 pages.

Written Opinion mailed Mar. 4, 2021 for Appl. No. PCT/EP2020/084306, 5 pages.

Cutrí E. et al: The cardiac torsion as a sensitive index of heart pathology: A model study, Journal of the Mechanical Behavior of Biomedical Materials, Elsevier, Amsterdam, NL, vol. 55, Oct. 31, 2015 (Oct. 31, 2015), pp. 104-119.

* cited by examiner

ESTIMATING A VALUE ASSOCIATED WITH HEART WALL TENSION

The present invention relates to a method of estimating and assessing a value associated with heart wall tension. The invention further relates to a corresponding apparatus and computer programme product.

Cardiac output is a blood flow parameter that describes the volume flow rate of blood being pumped by the heart around the body. Cardiac output is a key indicator of heart performance, in particular the heart's ability to meet the demands of perfusion within the body. Cardiac output is the product of the heart rate of a patient multiplied by the volume of blood pumped by the heart, specifically the left ventricle of the heart, around the body (stroke volume).

The stroke volume of the heart, and thereby cardiac output, is dependent on a number of factors, including contractility, afterload and preload.

Contractility equates to the 'power' of the heart, and describes the ability of the myocardium to contract in the absence of any changes in preload or afterload.

Afterload is the resistance in the patient's circulatory system provided against the ejection of blood from the left ventricle of the heart during systole (i.e. the contraction phase of the heart). The resistance is determined by the diameter of the arterioles and pre-capillary sphincters about the body. The narrower or more constricted the arterioles and pre-capillary sphincters about the body, the higher the resistance. Afterload can be understood as correspondent to the arterial pressure that the heart must work against to eject blood during systole.

Preload is the myocardial wall stress at the end of diastole (i.e. the filling phase of the heart), just prior to contraction of the heart and is thus directly comparable/related to the tension in the heart wall at the end of diastole (and hence derivable therefrom). Preload can also be defined as the end diastolic transmural pressure. Preload is directly related to the ventricular volume of at the end of diastole, since a higher level of ventricular filling will typically result in a larger stress/tension within the myocardium and thus a higher preload. In turn, preload can be seen to be directly related to the return of venous blood from the body to the heart since venous return is directly related to left ventricular volume at the end of diastole.

An increased ventricular preload leads to an increased stroke volume and thus increased cardiac output. The relationship between preload and stroke volume is known as the Frank-Starling law of the heart, which states that the stroke volume of the heart increases in response to an increase in preload when all other factors remain constant. This is, at least in part, due to the fact that a larger preload will result in a larger stretch of the myocardial fibres, leading to an increase in the force of contraction of the heart.

A graphical illustration of the Frank-Starling law is shown in FIG. 1, which is a plot 1 of stroke volume on the ordinate against preload on the abscissa. The plot shows three different Frank-Starling curves 3a-3c representative of three different hearts of different contractility. Curve 3b is representative of a typical, healthy heart at rest and having intermediate contractility, curve 3c is representative of a typical, healthy heart during exercise and of high contractility, and curve 3a is representative of a diseased, failing heart having low contractility. For each of the curves 3a-3c, it can be seen initially that there is a proportionality between stroke volume and preload in accordance with the Frank-Starling law of the heart. However, as preload further increases, eventually the myocardial fibres are overstretched and as a result stroke volume eventually begins to decrease. The point at which an increase in preload results in a decrease in stroke volume is represented by the maxima 5a-5c on each of curves 3a-3c. The curves 3a-3c also demonstrate how, for a given preload, a heart having a higher contractility (e.g. curve 3a) will have a greater stroke volume than a heart having a lower contractility (e.g. curve 3c).

Thus, ventricular preload has a direct and measurable impact on the stroke volume and thereby the cardiac output of the heart, and is hence a key determinant in cardiac output. Thus, it is a desirable parameter to monitor and assess such that cardiac health can be monitored.

Preload is not the only parameter of the heart that is desirable to monitor however. It is also desirable to monitor tension in the heart wall more generally, and there are several other physiological parameters of the heart that are either associated with or directly related to the tension in the heart wall at various other stages in the heart cycle and which are of importance or desirable to be able to monitor. For instance, it is desirable to be able to monitor the contractility of the heart as this can give insights into the power and overall health of the heart. The tension within the heart at the end of the systolic phase of the heart can give insight regarding contractility. Thus, it is not just the tension at the end of the diastolic phase of the heart and preload that are desirable to be able to monitor.

Prior art systems that allow for estimation of ventricular preload include Pulse Contour Cardiac Output (PiCCO™) systems introduced by Pulsion Medical Systems AG, of Germany, and LiDCO™ systems introduced by LiDCO Limited of England.

PiCCO™ systems work on the basis of two principles. The first, is that the volume of venous return to the heart (and hence, as noted above, preload) is related, inversely to intra-thoracic pressure. The second is that intra-thoracic pressure changes during mechanical ventilation of a patient cause arterial blood pressure variations during the ventilation cycle, with the intra-thoracic pressure and arterial blood pressure being proportional with one another as demonstrated in FIG. 2.

FIG. 2 is a plot of airway pressure 10 and a plot of arterial pressure 20 shown on a common abscissa representative of time. Region 11 of plot 20 is a period of respiration (both inhalation and exhalation), during which the intake of air results in a maximum 13 airway pressure corresponding to a maximum intra-thoracic pressure. Closely coincided with this maximum 13 airway pressure is the maximum 21 arterial systolic pressure of the patient as a result of the high intra-thoracic pressure. Region 15 represents a pause in the respiration cycle, during which airway pressure and thereby the intra-thoracic pressure is at a minimum. During such a pause, systolic arterial pressure also reaches a minimum 23.

FIG. 3 is a plot of stroke volume 30 on the ordinate against an abscissa representative of time. Stroke volume traces of the type shown in FIG. 3 are derivable from arterial pressure measurements recorded with PiCCO™ systems such as those shown in FIG. 2. It will be noted that the plot of stroke volume 30 is similar in character to the plot of arterial pressure 20 shown in FIG. 2 in that it depicts variations in stroke volume over time resulting from changing intra-thoracic pressure during mechanical ventilation. A maximum stroke volume 31 and a minimum stroke volume 33 are shown on the plot, which coincide with a minimum intra-thoracic pressure and maximum intra-thoracic pressure during the ventilation cycle, respectively.

PiCCO™ systems typically utilise an intravascular catheter that is inserted into the axillary, brachial, femoral or radial artery to thereby measure the arterial pressure changes during ventilation. For calibration purposes a cold or room temperature saline bolus is injected and the impact of this is measured by arterial thermistor. From the resulting arterial pressure data that is recorded (such as that shown in plot 20) a percent pulse pressure variation (PPV) and/or a percent stroke volume variation (SVV) can be determined based on the maximum (e.g. 21) and minimum (e.g. 23) systolic pressures, and the maximum (e.g. 31) and minimum (e.g. 33) stroke volumes measured and calculated during a ventilation cycle as per equations (1) and (2) below:

$$SVV\ \% = (SV\max - SV\min)/\left(\frac{(SV\max + SV\min)}{2}\right) \times 100 \quad (1)$$

$$PPV\ \% = (PP\max - PP\min)/\left(\frac{(PP\max + PP\min)}{2}\right) \times 100 \quad (2)$$

Where $SV_{max}$ is the maximum stroke volume during the ventilation cycle (e.g. 31), $SV_{min}$ is the minimum stroke volume during the ventilation cycle (e.g. 33), $PP_{max}$ is the maximum pulse pressure (e.g. 21) during the ventilation cycle, and $PP_{min}$ is the minimum pulse pressure during the ventilation cycle (e.g. 23).

The determined PPV/SVV are indicative of the relative change in the arterial pressure/stroke volume during a ventilation cycle as compared to a mean arterial pressure/stroke volume during said ventilation cycle. Thus, a high PPV/SVV is indicative of a low arterial pulse pressure/stroke volume respectively. Given the above described relationships with preload, if a low arterial pulse pressure/stroke volume is determined it can also estimated that preload is also low.

Therefore, by determining and monitoring PPV and/or SVV that have been calculated based on arterial pressure readings using the PiCCO™ system, ventricular preload can be monitored. A PPV and/or SVV of greater than 15% is typically indicative of a low ventricular preload. A PPV and/or SVV of lower than 10% is seen to be indicative of a heart having a normal, sufficient preload.

The PPV and/or SVV values determined using the PiCCO™ system may further be used, in conjunction with a monitored cardiac output of a patient, to assess a volemic state of the heart. In particular, where a heart is determined as having a normal, sufficient preload (i.e. a PPV and/or an SVV of <10%) but the heart is also determined as having a reduced cardiac output, it can be determined that that the myocardial muscle fibres are overstretched by virtue of hypervolemia, and thus the heart is at risk of overloading and heart failure. Corresponding, but reversed, logic allows for the determination of a hypovolemic heart. It will be appreciated to those skilled in the art that an intravascular volemic state of a patient is a hemodynamic variable of paramount importance.

LiDCO™ systems work on a similar basis to PiCCO™ systems in that they rely on variations in pressure measurements during mechanical ventilation of a patient to determine an SVV of the patient, and thereby allow for preload to be estimated. A volemic state of the heart may also be monitored using LiDCO™ systems in a similar manner to PiCCO™ systems as above. LiDCO™ systems may rely on invasive pressure catheters similar to those outlined above in relation to PiCCO™, or they may make use of less invasive, or even non-invasive pressure sensors to allow for pulse pressure measurements to be taken. However, the less invasive sensors that may be used are typically less accurate and precise than the invasive pressure catheters described above. LiDCO™ relies on calibration that is performed by injecting a small amount of Lithium intravenously (any vein, not necessarily central). Arterial lithium concentration is recorded by drawing blood past a lithium sensor attached to the patient's existing arterial line. With the resulting concentration-time curve, the cardiac output can be calculated.

Whilst both PiCCO™ and LiDCO™ systems allow preload to be monitored, the monitoring is an indirect monitoring. Preload values using PiCCO™ and LiDCO™ systems are inferred from pressure measurements rather than monitored directly. Thus, these systems rely on monitoring a surrogate for preload and making inferences regarding preload from said surrogate. This is associated with inaccuracies as there is not necessarily a direct correspondence between these surrogate values and preload.

Moreover, PiCCO™ and LiDCO™ systems are preferentially reliant on an invasive pressure catheter (those systems that are not reliant on such invasiveness are less accurate and precise as noted above). Such invasive equipment is both associated with non-insignificant health risks, and further can only be used under the supervision of medically trained professionals in a hospital setting or similar. Thus, such systems have poor mobility and cannot be used to monitor a patient on a continuous basis outside of a hospital setting as the patient goes about their normal everyday lives. Rather these systems are used on an intermittent, in-patient basis.

Furthermore, PiCCO™ and LiDCO™ are limited in their application in that they only allow for monitoring of ventricular preload and do not allow for a monitoring of heart wall tension more generally.

Consequently, improved and alternative methods for monitoring preload, tension in the heart wall more generally, and other parameters and values associated with tension in the heart wall are desired.

In its broadest sense, the present invention provides a method of estimating a value associated with tension in the heart wall (i.e. a tension in the myocardium) based on motion of the heart. In an aspect the invention therefore provides a method of estimating a value associated with tension in the heart wall, the method comprising: using motion data recorded with a sensor in communication with the heart to identify motion of the heart; and estimating a value associated with tension in the heart wall based on the identified motion of the heart.

The inventor(s) have come to the non-obvious realisation that a tension in the heart, and other associated values and parameters, can be estimated based on motion in/of the heart. Thus, it is not required to rely on an arterial pressure measurement, as in the prior art LiDCO™ and PiCCO™ systems, to provide an indirect estimate of parameters of values related to a tension in the heart wall. As such, a more accurate and precise estimation of heart wall tension, and values and physiological parameters related to heart wall tension (e.g. preload) may be achieved by the method of the first aspect as, for instance, compared to prior art LiDCO™ and PiCCO™ systems. Notably, higher precision/accuracy may be achieved by the method of the first aspect because external factors affecting the pressure measurements in LiDCO™ and PiCCO™ systems, such as aortic valve regurgitation and over or under-damped arterial pressure waveforms, will not correspondingly impact on the identified motion of the heart on which the estimation of the first aspect of the invention is reliant upon.

The motion of the heart used as the basis of the subsequent estimation is optionally motion that is inherent to the heart itself. That is to say, the motion may naturally occur as part of the normal functioning of the heart and is not induced by some external impetus (e.g. an activator). For instance, as discussed in more detail below, the motion may result from the various stages in the heart cycle. The motion might result from (e.g. a vibration resulting from) one or more valves closing and/or opening in the heart during its cycle. This may be any of the mitral, aortic, pulmonary and/or tricuspid valves. Alternatively, the motion may be the motion of the heart wall itself as it contracts and expands during the heart cycle.

As an alternative, the motion of the heart used as the basis of the estimation may be an induced motion (i.e. one which is artificially created by an activator or other similar means).

Advantageously, the method may use a motion of the heart in the form of a vibration in the wall of the heart. The inventors have come to the non-obvious realisation that the frequency of a measured vibration in the heart wall at any given time can be used to estimate a tension in the heart wall at that particular time, and this estimated tension can thereby optionally be used to estimate other values associated with tension in the heart wall. This is because, a frequency of vibration within the heart wall is indicative of a tension in the heart wall at the time of vibration, similar to the way that the tension of a drum skin will affect the sound produced. Consequently, by measuring the frequency of an identified vibration within the heart wall, a tension in the heart wall and thereby a wall stress (e.g. ventricular preload) or other values and parameters associated with tension in the heart wall can be estimated.

The use of a vibration in the wall of the heart in order to determine heart wall tension can be derived from Mersenne's law of a vibrating monochord, which is set out in equation (3):

$$f = \frac{1}{2L}\sqrt{\frac{T}{\mu}} \qquad (3)$$

Where f is the frequency of vibration of the monochord, L is the length of the monochord, T is the tension in the monochord and μ is the density of the monochord.

By modelling each muscle fibre in the wall of the heart as a monochord, it can be derived that the tension in the heart wall is proportional to the square of the frequency of a vibration in the heart multiplied by the square of the length of the muscle fibres in the heart wall and by the density of the muscle fibres. Under an assumption that at any given time the density and length of the muscle fibres remain constant, then the tension in the heart wall can be considered to be directly proportional to the square of a frequency of a vibration in the wall of the heart at that time. Hence, a determination of the frequency of vibration in the wall of the heart at a given time allows a tension in the wall of the heart to be estimated.

Therefore, based on the above, it can be understood that at any given point in time within the heart cycle, at which time the length L of the muscle fibres and their density p can be considered to be constant, a frequency f of the vibration in the heart wall is proportional to the square root of the tension T within the heart wall. Therefore, by measuring a frequency of vibration within the heart wall, a tension in the heart wall can be estimated and subsequently other values or parameters related to the tension in the heart wall may be estimated. This concept of directly calculating a tension in the heart wall based on a measured vibration in the heart wall and thereby optionally estimating other parameters or values associated with the tension in the heart wall is considered to be independently unique and inventive in its own right. Prior art methods to date have only allowed for inferences to be drawn in connection with the tension in the heart wall or a ventricular preload based on a measured surrogate variable for heart wall tension/preload as discussed above. The current invention allows for a direct calculation of heart wall tension and parameters/values associated therewith, which is unique and not previously contemplated in the prior art.

The method of the first aspect may further comprise the step of estimating a volemic state, or a relative change in volemic state over time, of the heart based on the estimated value associated with tension in the heart wall. As can be derived from the foregoing discussion and from La Place's law (see equation (4) below), tension in the heart wall is directly related to the ventricular volume. Therefore, by estimating a value associated with tension in the heart wall an estimation of the volemic state of the ventricles can also be estimated.

Laplace's law states:

$$\sigma = Pr/w \qquad (4)$$

where σ is the stress (which is directly related to tension) in the wall of the heart, P is the ventricular pressure, r is the ventricular radius and w is the thickness of the heart wall. At a given point in time in the heart cycle it can be assumed that the wall thickness w and pressure P within the heart are constant. Consequently, it can be derived that the wall stress σ at this given point in time is directly proportional to the ventricular radius r, which in turn is directly related to the volume of the heart. Thus, by estimating a value associated with tension in the heart wall a volemic state of the heart may also be estimated and/or a relative change in the volemic state of the heart over time may be estimated.

The method of the first aspect may be used to monitor dynamic changes in the value associated with tension in the wall of the heart over time. That is to say the method of the first aspect may be used to monitor/estimate a plurality of different values associated with tensions in the heart wall over time. This is achieved by repeating the steps of the method of the first aspect over time. As such, the method of the first aspect may comprise: using motion data recorded with a sensor in communication with the heart to identify motion of the heart at a first point in time; estimating a value associated with tension in the heart wall based on the identified motion of the heart at the first point in time; using motion data recorded with a sensor in communication with the heart to identify motion of the heart at a at least one further point in time (e.g. a vibration in the wall of the heart); and estimating a further value associated with tension in the heart wall based on the identified motion of the heart at the at least one further point in time. Such a method can be employed continually/repeatedly to allow for a continuous monitoring of values associated with tension in the heart wall as it develops/changes over time.

Thus, the method of the first aspect may be used to continually monitor and/or estimate a value associated with tension in the heart wall of the patient in real time, for example when a patient is undergoing a treatment during which it is beneficial to have real time, live knowledge of a value associated with heart wall tension. Prior art techniques as discussed above may only estimate an average ventricular preload (and only a ventricular preload, not a heart wall tension value more generally) over a certain, discrete period of time and/or may be less suited for continual monitoring. In particular, PiCCO™ systems as described above are dependent on a thermodilution calibration and will drift based on vascular compliance. Therefore, PiCCO™ require recalibration when changes in vascular compliance occur, thus making such systems less suited to continual monitoring.

The method of the first aspect may be carried out in real time based on motion data that is being recorded in real time. Alternatively, the method may be carried out as a retrospective estimation. That is to say that a value associated with heart wall tension may be estimated based on pre-recorded motion data.

The sensor in communication with the heart used to identify the motion data of the heart may be, for example, an accelerometer, a magnetometer, a gyro, a miniaturised ultrasound sensor or otherwise. The sensor may be a motion sensor for detecting motion of the heart based on movement and/or acceleration experienced by the sensor. Such sensors may be invasive sensors implanted within a patient. For instance, such sensors may be implanted at the heart. Such sensors may be implanted epicardially, endocardially or within the myocardium itself. An implanted sensor may be described as an invasive heart sensor.

The sensor may have been previously implanted at the heart/within the patient for an alternative purpose to that of estimating a value associated with heart wall tension. For instance, as outlined below, the sensor may be incorporated within a pacemaker device already implanted at the patient's heart. By using motion data from a sensor previously implanted at the heart the health risk to the patient associated with implanting an additional sensor required for carrying out the method of the first aspect is reduced.

It is known to use a pacemaker device where the pacemaker lead incorporates a motion sensor (e.g. an accelerometer and/or gyro) to be placed at the heart along with pacemaker electrodes for the purposes of cardiac resynchronisation therapy. Thus, the sensor of the above method may be a motion sensor in a pacemaker lead, which may have been a device previously implanted for cardiac resynchronisation therapy or otherwise. Since these types of motion sensor enhanced pacemaker devices are already in use then the currently proposed method can be added to existing systems, and used with existing patients, by means of additions to the software for controlling the sensor and/or for processing the output of the sensor.

Alternatively, the sensor used to identify the motion data of the heart may be of the non-invasive type. Such a sensor may be based on non-invasive imaging techniques, such as computed tomography, echocardiography, magnetic resonance imaging, radar etc. Alternatively, such a non-invasive sensor may be a motion sensor for detecting motion of the heart based on movement and/or acceleration experienced by the sensor, for instance a sensor comprising an accelerometer, a gyro and/or a magnetometer. A motion sensor of this type may be placed on the skin of a patient's chest in proximity with the heart.

Such non-invasive techniques allow for heart wall motion to be monitored non-invasively and do not require a sensor to be surgically inserted into a patient for the determination of a value associated with heart wall tension. Hence, there is significantly reduced risk to the patient's health when compared to, for instance, prior art LiDCO™ and PiCCO™ systems that typically rely on the surgical implantation of a pressure catheter.

The concept of determining a value associated with heart wall tension based on a vibration is seen to be a particularly beneficial combination of features. Thus, in an example embodiment of the invention there is provided a method of estimating a value associated with tension in the heart wall, the method comprising: using motion data recorded with a sensor in communication with the heart to identify a vibration in a wall of the heart; determining a frequency of the vibration in the wall of the heart; and calculating an estimated value associated with tension in the wall of the heart based on the frequency of the vibration.

The value associated with a tension in the heart wall estimated using the method of the first aspect may in fact be a tension in the heart wall itself, rather than some value or parameter derived or related to the tension in the heart wall. Thus, in an optional embodiment, the invention provides a method of estimating a tension in the heart wall, the method comprising: using motion data recorded with a sensor in communication with the heart to identify motion in the heart; and estimating a tension in the heart wall based on the identified motion in the heart.

The tension estimated may be a tension of the heart wall at any given point within the cycle of the heart. For instance, the tension in the heart wall may be a tension at the end of the systolic phase of the heart as this can give insight regarding the contractility of the heart. This may be achieved by calculating a tension based on a vibration induced by, for example, the second heart sound and/or the closure of the aortic and/or pulmonic valves). The method of the first aspect of the invention may thus comprise the additional step of estimating, e.g., contractility or afterload based on the estimated tension in the heart wall.

However, as noted above, it is of particular interest to estimate ventricular preload (which is proportional to the tension in the heart wall at the end of the diastolic phase of the heart). Thus, in an optional form of the invention, the method of the first aspect of the invention comprises estimating a tension in the heart wall at the end of the diastolic phase of the heart. From this, a ventricular preload of the heart may be estimated. The method of the first aspect of the invention may thus additionally comprise estimating a ventricular preload based on the estimated tension in the heart wall.

Alternatively, the value associated with a tension in the heart wall estimated using the method of the first aspect may be a ventricular preload. That is to say, there may not be a separate step of estimating a tension in the heart wall, and the method may proceed directly to the step of estimating a ventricular preload based on the identified motion in the heart.

Thus, in an optional embodiment, the invention provides a method of estimating a ventricular preload, the method comprising: using motion data recorded with a sensor in communication with the heart to identify motion in the heart; and estimating a ventricular preload based on the identified motion in the heart.

The ventricular preload may be a preload of the right ventricle of the heart. Alternatively, the ventricular preload may be a preload of the left ventricle of the heart.

In embodiments where vibration is used as the basis of estimation, and where the method is for estimating a ventricular preload (either directly from the identified motion in the heart or based on an estimation of tension in the heart wall) the vibration in the wall of the heart may be at any point time whilst the myocardial wall stress in the heart wall is at, or close to, a maximum at, or near, end-diastole for a given heart cycle since these points in time are synchronous with preload. Such a point in time will be just prior to contraction of the heart. This vibration in the wall of the heart thus may be, for example, at the start of at least one systolic phase of the heart, at the end of at least one diastolic phase of the heart, at the start of at least one heart cycle and/or at a time between the start of electrical stimulation of the heart and the start of an ejection phase of the heart. As can be derived from the discussion above, the stress in the heart wall at any of the above points in time will be closely or directly correspondent with ventricular preload.

In view of the above discussion, it will be appreciated that the vibration in the heart wall used to estimate ventricular preload should be synchronous with a point in time just prior to the contraction of the heart (e.g. synchronous with the end of diastole and/or the start of systole). Therefore, given its synchronicity with the start of systole, it is advantageous to measure the vibration in the wall of the heart that results from mitral valve closure and/or the first heart sound. Vibrations resulting from other heart events may additionally and/or alternatively be measured and used to estimate ventricular preload. Additionally and/or alternatively artificially induced vibrations within the heart wall may be measured and used to estimate ventricular preload.

The estimation of a ventricular preload directly based on the identified motion in the heart is not however limited to methods reliant on a vibration as the basis of the estimation. As an alternative to a vibration in the wall of the heart, the ventricular preload may be estimated based on a variation in heart wall motion over at least one ventilation cycle of the patient. Thus, the step of using motion data recorded with a sensor in communication with the heart to identify motion in the heart may comprise identifying motion in the heart wall over at least one ventilation cycle. The method may then further comprise the step of determining a variation in the heart wall motion over the at least one ventilation cycle of the patient.

The variation in heart wall motion can be understood to be variations in the motion of the heart wall during the cardiac cycle. That is to say, the identified motion may be the movement of the heart wall during both systole and diastole of the heart. The variation in heart wall motion may also be termed variation in myocardial motion.

The inventors have come to the realisation that variations in heart wall motion over at least one ventilation cycle can be used to estimate a ventricular preload (though such methods are limited to the estimation of ventricular preload, and are not more broadly applicable to heart wall tension or values related to heart wall tension more generally). This realisation is based on similar principles to those which the prior art PiCCO™ and LiDCO™ systems are based on, and the resulting methods are enhanced by the avoidance of the need for dedicated extra pressure (and/or temperature) sensors. As noted above, the volume of venous return to the heart (and thus preload) is inversely proportional to intrathoracic pressure. Additionally, heart wall motion is directly proportional to the volume of venous return (and thereby is also inversely proportional to preload). This is because a heart having a greater volume of blood therein at the end of diastole will be larger and can thus undergo a greater magnitude of contraction during systole. Therefore, over the course of a ventilation cycle, heart wall motion will vary due to the different preloads resulting from changing intrathoracic pressure. By measuring a relative change in heart wall motion over at least one ventilation cycle, an exemplary implementation of which is set out in Equation (5), an indication as to the heart wall variation during the at least one ventilation cycle can be determined.

$$PPDV\% = (PPD\text{max} - PPD\text{min}) / ((PPD\text{max} + PPD\text{min})/2) \times 100 \quad (5)$$

where PPDV % is the peak to peak displacement variation during a ventilation cycle, PPDmax is the maximum peak to peak displacement during the ventilation cycle, and PPDmin is the minimum peak to peak displacement during the ventilation cycle.

As a further example, a relative change in heart wall motion can be measured using variation in the velocity of the heart wall during the ventilation cycle.

Given the above described proportionality with preload, if the variation of heart wall motion during the at least one ventilation cycle is determined to be low, then it can also be estimated that the ventricular preload is sufficiently high. If the variation of heart wall motion during the at least one ventilation cycle is determined to be high, then it can also be estimated that the ventricular preload is low.

The concept of estimating ventricular preload based on a variation in heart wall motion over at least one ventilation cycle of the patient is seen to be a particularly beneficial combination of features. Thus, in an example embodiment of the invention there is provided a method of estimating ventricular preload of a patient, the method comprising: using motion data recorded with a sensor in communication with the heart during at least one ventilation cycle of the patient to identify heart wall motion; determining a variation in the heart wall motion over the at least one ventilation cycle of the patient; and estimating a ventricular preload based on the variation in heart wall motion over the at least one ventilation cycle of the patient.

As discussed above, preload is not the only value associated with tension in the heart wall that is desirable to monitor. There are several other physiological parameters of the heart that are either associated with or directly related to the tension in the heart wall (e.g. at various other stages in the heart cycle) that are desirable to monitor. Thus, in the method of the first aspect of the invention the value associated with tension in the heart wall may be, for instance, contractility or afterload. Alternatively, the value associated with tension in the heart wall may be a tension of the heart wall itself at a stage of the heart other than end diastole.

It will be appreciated that the estimations of values associated with tension in the heart wall, and the physiological parameters that can be derived therefrom, may be used in various ways to assess the patient. One example implementation pertaining to an estimated ventricular preload involves producing a patient specific Frank-Starling curve. As noted above, the Frank-Starling law of the heart states that the stroke volume of the heart increases in response to an increase in ventricular preload, when all other factors remains constant. A Frank-Starling curve is a representation similar to that of FIG. 1, and by obtaining an estimation of preload together with a measurement of heart function it becomes possible to accurately map a suitable curve for any given patient.

Thus, according to a further aspect of the invention there is provided a method for producing a patient specific Frank-Starling curve. The method comprises: carrying out a method as defined in any of the relevant preceding statements to determine an estimate of ventricular preload; obtaining a measurement of patient cardiac function contemporaneous (i.e. at the same time) with the estimate of ventricular preload; and producing a patient specific Frank-Starling curve based on the measurement of patient cardiac function and the estimate of ventricular preload.

It will be appreciated that the patient specific Frank-Starling curve produced from the above method will be improved when it is produced based on a range of different estimated ventricular preloads of the patient. As such, the method of this further aspect may advantageously comprise: repeating the steps of the method as defined in the relevant preceding statements over a period of time such that a plurality of estimates of ventricular preload are obtained; obtaining a plurality of measurements of patient cardiac function that are contemporaneous with each of the estimates of ventricular preload; and producing a patient specific Frank-Starling curve based on the plural measurements of patient cardiac function and the plural estimates estimate of ventricular preload.

It will also be appreciated that the patient specific Frank-Starling curve produced will be improved when it is produced based on a range of different volemic states of the heart. A Frank-Starling curve produced based on a range of different volemic states will be able to better predict the fluid responsiveness of the patient. This, as will be appreciated, is particularly advantageous, most notably because fluid resuscitation is often the first line of defence in critically ill patients and therefore improved knowledge of how administration of fluid is likely to affect such patients in critical situations can aid in saving lives. Thus, at least one, and advantageously more, of the plurality of estimates of ventricular preload is/are estimated whilst the heart is at a different volemic state. Advantageously, the plurality of estimates of ventricular preload are recorded over a range of different volemic states of the heart.

The different volemic state of the heart may be induced by artificially fluid loading and unloading the heart.

The measurement of heart function used in conjunction with the estimated ventricular preload to produce a patient specific Frank-Starling curve may be stroke volume, cardiac output, peak systolic velocity, pressure-displacement loop area and/or any other suitable measurement of heart function. Such a measurement of heart function may be determined using a sensor in communication with the heart to identify motion in the heart. For instance, stroke volume may be determined based on heart wall velocity determined using, for example, an accelerometer implanted in or at the heart. The inventors' earlier work as, for example, set out in Halvorsen, P. S. et al. Automatic real-time detection of myocardial ischemia by epicardial accelerometer. J. Thorac. Cardiovasc. Surg. 139, 1026-32 (2010), Grymyr, O. H. N. et al. Continuous monitoring of cardiac function by 3-dimensional accelerometers in a closed-chest pig model †. Interact. Cardiovasc. Thorac. Surg. 1-10 (2015), and Grymyr, O.-J. H. N. et al. Assessment of 3D motion increases the applicability of accelerometers for monitoring left ventricular function. Interact. Cardiovasc. Thorac. Surg. 20, 329-337 (2015) has demonstrated how implanted accelerometers may be used for estimating cardiac function. The sensor used to assess patient cardiac function may be the same sensor or a different sensor to that used in the estimation of ventricular preload. For instance, the cardiac function may be derived from an invasive or non-invasive sensor, a sensor comprising an accelerometer, gyro and/or a magnetometer, a sensor based on computed tomography, echocardiography, magnetic resonance imaging or radar, a PiCCO™ system and/or a LiDCO™ based system.

According to another aspect of the invention, there is provided a heart monitoring system comprising: a sensor configured to be placed in communication with the heart in order to identify motion in the heart; and a data processing device arranged to: receive motion data from the sensor; identify motion in the heart from the received motion data; and estimate a value associated with tension in the heart wall based on the identified motion in the heart.

The data processing device may be arranged to carry out the method as defined in any of the preceding statements.

The sensor of the heart monitoring system may comprise at least one accelerometer, magnetometer and/or at least one gyro.

The sensor may be an invasive sensor configured to be implanted at the heart, for example at the epicardium, the endocardium and/or the myocardium.

The sensor may be comprised within a pacemaker lead that is to be positioned at the heart.

The sensor may be a non-invasive sensor, such as a sensor based on computed tomography, echocardiography, magnetic resonance imaging or radar. Alternatively, such a non-invasive sensor may be a motion sensor for detecting motion of the heart based on movement and/or acceleration experienced by the sensor, for instance a sensor comprising an accelerometer, a gyro and/or a magnetometer. A motion sensor of this type may be placed on the skin of a patient's chest in proximity with the heart.

According to yet another aspect, there is provided a computer programme product comprising instructions that, when executed, will configure a data processing apparatus to perform the method as defined in any of the relevant preceding statements.

Certain example embodiments of the present invention will now be described, by way of example only, and with reference to the accompanying embodiments, in which.

Figure 1:
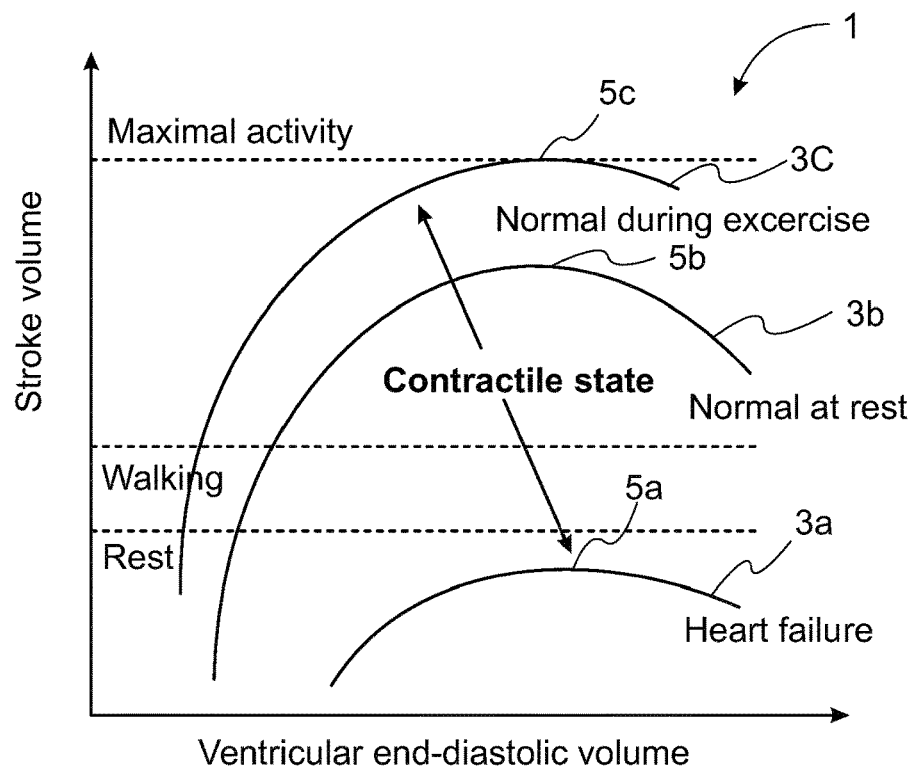
FIG. 1 shows a graphical illustration of Starling's Law.
Figure 2:
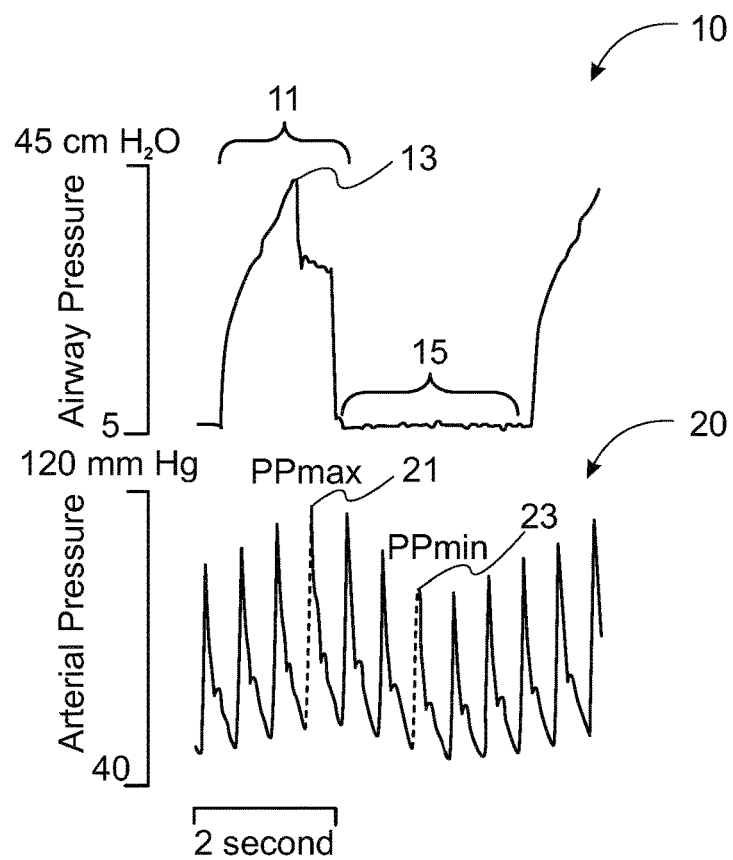
FIG. 2 shows a graphical illustration of varying airway pressure and arterial pressure over time.
Figure 3:
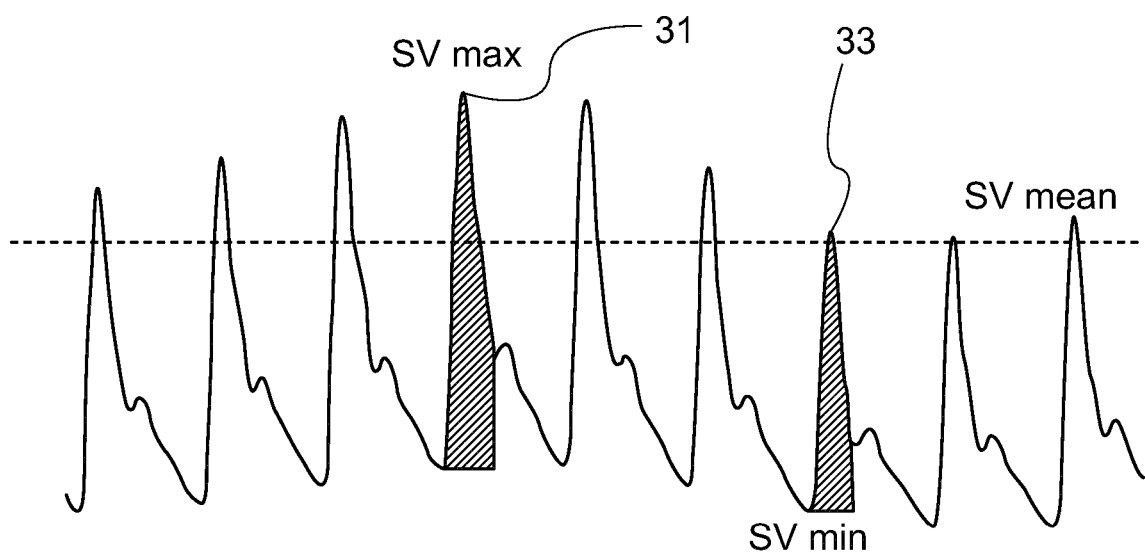
FIG. 3 show a graphical illustration of varying stroke volume over time.

The following discussion pertains to a study carried out by the inventors to estimate left ventricular preload, and thereby left ventricular filling status, using an epicardially placed accelerometer within a number of pigs. The accelerometer was also used to assess fluid responsiveness of the heart. The study as presented herein is merely an example of the aspects of the invention as set forth above, and as defined in the claims. The scope of protection should not be seen to be limited to this specific implementation. For instance, whilst the below discussion pertains to the estimation of ventricular preload, it will be understood that the invention is not limited to preload estimations and that, as described, the invention has broader applications in the estimation of values associated with tension in the heart wall more generally (e.g. tension in itself). Moreover, whilst the below discussion exemplifies the use of epicardially implanted accelerometers, it will be appreciated that other sensors and modalities may be used to determine heart wall motion in accordance with aspects of the invention. Furthermore, the below discussion outlines how heart wall vibration is used as the basis of estimation; however variation in heart wall motion may equally be used for estimation of ventricular preload.

SUMMARY

In the inventors' study, heart wall vibrations were continuously measured using a three-axis accelerometer sutured to the left ventricular (LV) epicardium in 9 pigs during baseline, fluid loading and phlebotomy in a closed chest condition. So as to evaluate the accuracy and reliability of the results using the three-axis accelerometer, sonomicrometry was used as gold standard for continuous measurements of LV volume, and a change in end diastolic volume ($EDV_{SONO}$) was used as an index for a change in preload. Additionally, global end-diastolic volume was estimated using PiCCO™ ($GEDV_{PICCO}$) and pulmonary artery occlusion pressure (PAOP) was measured with a pulmonary arterial catheter. Linear regression and Bland-Altman analyses were performed to determine the accuracy of $f_{s1}$, $GEDV_{PICCO}$, and PAOP referenced to $EDV_{SONO}$. A receiver operating characteristics (ROC) analysis was performed to determine the diagnostic accuracy (area under ROC curve) of identifying fluid responsiveness (defined as stroke volume variation (SVV) by sonomicrometry >11.6%) for $f_{s1}$, $SVV_{PICCO}$, pulse pressure variation ($PPV_{PICCO}$), $GEDV_{PICCO}$, and PAOP.

Methodology 9 land-race pigs (4 male) having an average weight 45 kg (±2 kg SD.) were used as the basis of the study. The animals were premedicated with an intramuscular injection of ketamine 20 mg/kg, azaperone 3 mg/kg and atropine 0.02 mg/kg. Anaesthesia was induced by intravenous thiopental 2-3 mg/kg and morphine 0.5-1 mg/kg. Immediately after induction of anaesthesia, tracheotomy was performed and anaesthesia upheld by inhalation (Isoflurane 1-2%) and morphine 0.50-1.0 mg/kg/h, adjusted by the animal's autonomous stress response. A Leon respirator was used for ventilation and gas monitoring with inspired oxygen fraction of 0.35. The animals were monitored by electrocardiogram (ECG), peripheral oxygen saturation (SpO2), temperature and diuresis. The internal and external jugular veins were cannulated for introduction of a central venous pressure catheter and pulmonary artery catheter (Edwards Lifesciences Corporation, Irvine, Calif., USA). The carotid arteries were cannulated to introduce two 5-Fr Millar pressure catheters into the left ventricle (LV) and aortic outlet (AO). A PiCCO™ catheter was introduced via a femoral artery.

After introduction of anaesthesia and hemodynamic monitoring, sternotomy was performed, and the pericardial sack was split from apex to base exposing the heart. To measure the LV volume, sonomicrometry crystals were placed sub-endocardially in a long axis pair (apex to anterior base), and short axis pair (equatorial, postero-lateral to antero-septal). From these two pairs the continuous volume could be estimated using the formula $V=\pi/6W^2H$, where W and H were the distance between the short axis pair and long axis pair, respectively.

To measure the myocardial vibrations, an inertial sensor (MPU9250, InvenSense Inc, San Jose, Calif., USA) incorporating a 3-axis accelerometer was placed in the anterior LV apical region.

Lastly, the thorax was closed by suturing sternum and skin. The intervention protocol was started after a 30 minutes stabilisation period following instrumentation.

After baseline measurements for each pig using the various different sensor modalities, including baseline measurements of ventricular preload for each pig, the ventricular preload of each pig was artificially altered by volume loading of 250 ml 0.9% NaCl solution in intervals until a 10% increase in end diastolic volume (EDV) was observed in the sonomicrometric volume trace. Recordings were obtained between each interval of loading. To decrease preload, blood was drained from the central venous catheter into heparinised bags in 250 ml or 500 ml intervals, in between recordings, until a 10% decrease in EDV from baseline was achieved.

Pulmonary artery occlusion pressure (PAOP) was recorded to assess the LV filling pressure. Using sonomicrometry, end diastolic volume ($EDV_{SONO}$), stroke volume ($SV_{SONO}$), cardiac output ($CO_{SONO}$), and stroke volume variation ($SVV_{SONO}$) were recorded as reference values. From the PiCCO recordings, cardiac output ($CO_{PICCO}$), global end-diastolic volume ($GEDV_{PICCO}$), stroke volume ($SV_{PICCO}$), stroke volume variation ($SVV_{PICCO}$), and pulse pressure variation ($PPV_{PICCO}$) were extracted for comparison with sonomicrometry and accelerometer derived values.

The epicardially placed accelerometers were used to measure the vibrations within the myocardium at the time of mitral valve closure and the first heart sound, events, which are contemporaneous with the start of systole. From the frequency of these measurements left ventricular preload could then be estimated. This estimation made was based on the derivation from Mersenne's law of a vibrating monochord, which is set out in equation (3) above. By modelling each muscle fibre in the wall of the heart as a monochord, and under an assumption that at any given time the density and length of the muscle fibres remain constant, it was possible to estimate the left ventricular preload due to its direct proportionality with the square of the frequency of a vibration in the wall of the heart at the time of mitral valve closure and the first heart sound. The frequency of the vibrations measured in the heart wall using the epicardially placed accelerometer were analysed in order to estimate left ventricular preload and were correlated with alterations in preload as described in further below.

Figure 4:
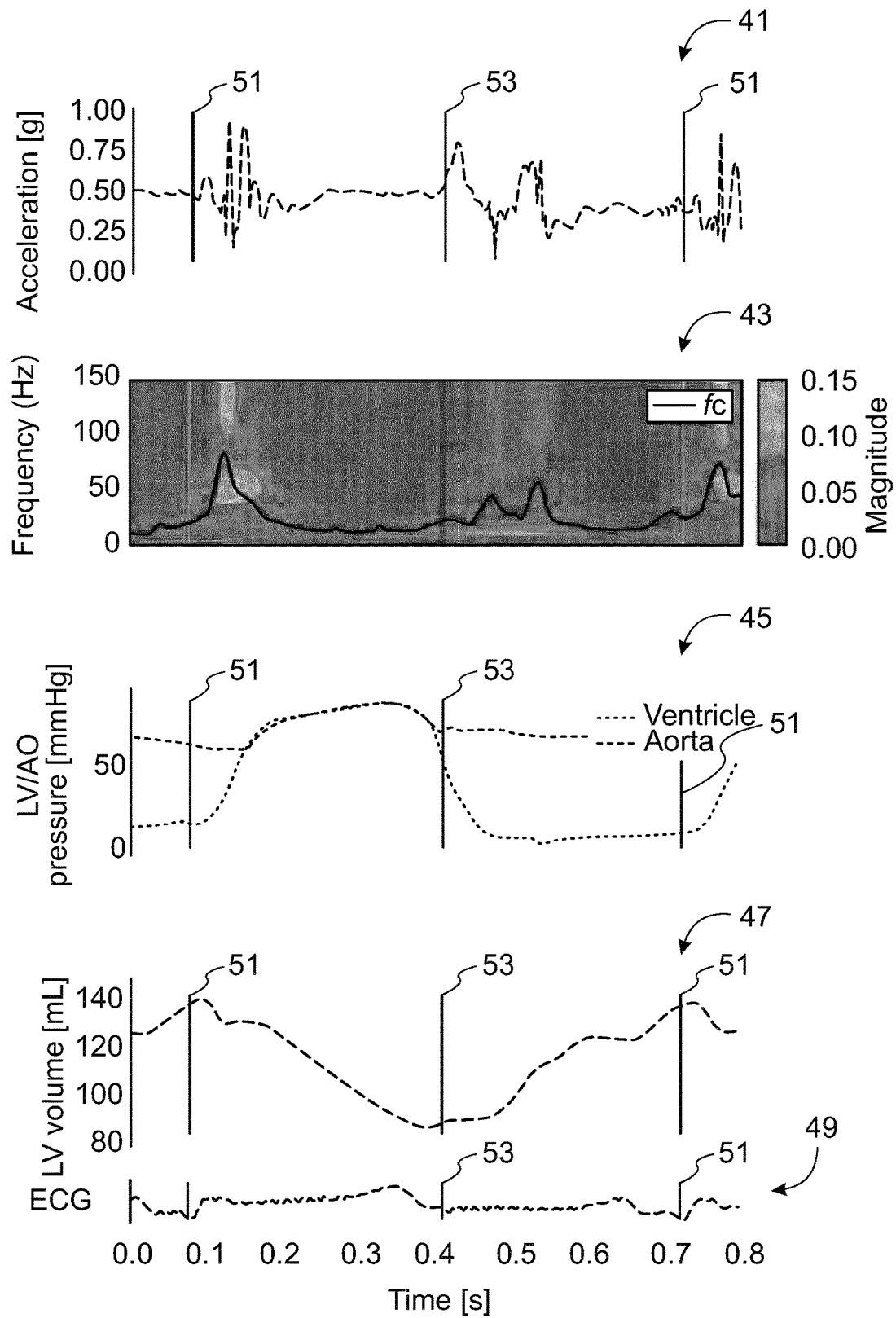
FIG. 4 shows graphical illustrations of data recorded using epicardially implanted accelerometers over time, along with various other hemodynamic parameters.

FIG. 4 shows representative data recorded using the epicardially implanted accelerometer along with various other heart measurement data recorded using the different sensor modalities over a common time period. Specifically, the top panel 41 of FIG. 4 shows raw acceleration data recorded using the implanted accelerometer as the sum of the three axes of the accelerometer. The second panel 43 shows the frequency spectrum over time (wavelet scalogram) for the sum of the acceleration data traces. The black trace in the frequency spectrum (fc) represents the centre frequency for each time point, which was extracted by calculating the weighted average frequency for each time point.

The third panel 45 shows a plot of LV pressure (the blue trace) and aortic pressure (the orange trace), the fourth panel 47 shows a plot of LV volume, and the fifth panel shows electrocardiographical (ECG) data recorded. Each panel 41-49 is plotted on a common time abscissa as shown at the bottom of panel 49. The vertical grey lines 51 in each panel indicate the time of Q in the ECG, which is considered to be the event indicating the end of the diastolic phase of the heart/the start of the systolic phase of the heart. The vertical green lines 53 in each panel indicate the time that the rate of change of LV pressure is at a minimum. This minimum was considered to indicate the end of the systolic phase of the heart.

Python™ Software Foundation, version 3.6.9, was used for all signal pre-processing, including the pre-processing of the raw acceleration date (e.g. as in panel 41). From the data recorded, data from at least 3 ventilation cycles were used for the basis of analysis to ensure that the values were unaffected by changes due to respiration.

The raw accelerometer signals (e.g. as in panel 41) were filtered using a $5^{th}$ order Butterworth band pass filter with cut off frequencies at 20 Hz and 250 Hz to remove high frequency noise and unwanted respiration and base heart rate effects on the frequency analysis. Since the accelerometer senses in three spatial directions (x, y, and z), the frequency analysis on each axis were performed individually and the average of these were taken for basis of analysis so as to nullify the orientation of the accelerometer placement and therefore the effects of gravity.

Frequency (wavelet) analysis of the raw accelerometer signals was used to analyse the frequency components of the first heart sound/mitral valve closure using MATLAB™. A continuous wavelet transform was used to produce a spectrogram (e.g. as in panel 43) containing the power of each frequency component in a signal over time. The colours in the spectrogram represent the magnitude of the particular frequency components in the transform, with the yellow/orange regions representing higher magnitude frequency components and the bluer regions representing lower magnitude frequencies.

Figure 5:
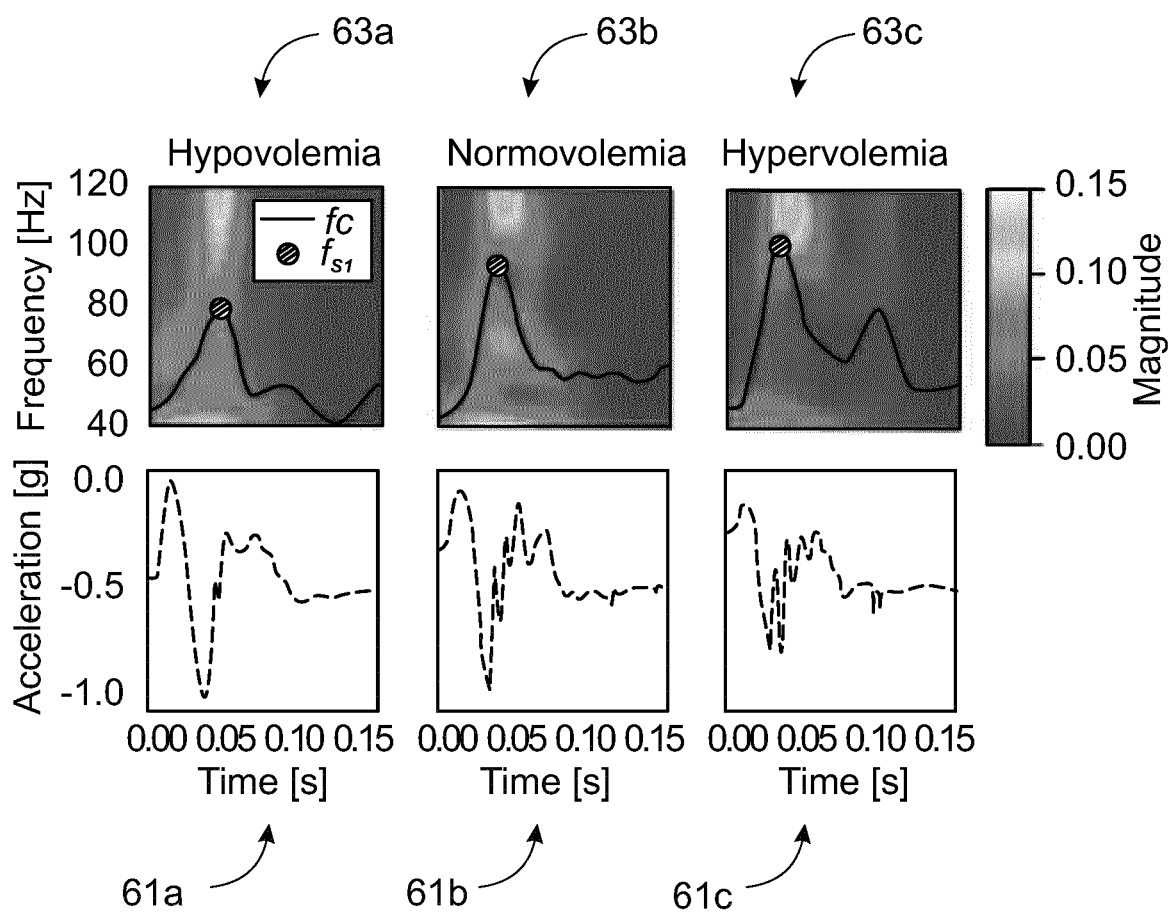
FIG. 5 shows other graphical illustrations of data recorded using epicardially implanted accelerometers over time.

FIG. 5 shows further traces of raw acceleration data and corresponding wavelet transforms and spectrograms similar to those shown in panels 41 and 43 of FIG. 4 respectively. The traces of FIG. 5 pertain to data recorded during the first 150 ms after end diastole (shown in panels 61a-61c) and the corresponding continuous wavelet transforms and spectrograms (shown in panels 63a-63c) produced from the raw acceleration data. Panels 61a and 63a are representative of data recorded for a hypovolemic heart, panels 61b and 63b pertain to normovolemic heart, panels 61c and 63c pertain to a hypervolemic heart. Again, the black trace represents the centre frequency ($f_c$) for each timepoint, whilst the red circle ($f_{s1}$) represents the point of maximum frequency within the time window.

To investigate preload changes, an analysis of the shift in the centre frequency $f_c$ was undertaken on the recorded data. An increasing centre frequency $f_c$ was predicted to indicate an increased preload. To determine a shift in the centre frequency $f_c$, the maximum value of the centre frequency $f_{s1}$ during the first heart sound within 0.03 and 0.1 s after end diastole was used as a comparator. To further reduce noise, the centre frequency trace for all heart cycles spanning the recording were averaged and the centre frequency $f_{s1}$ was calculated based on this average. A correlation analysis was then performed to assess the relationship between the myocardial frequency and end diastolic volume as determined by sonomicrometry measurement ($EDV_{SONO}$).

The $EDV_{SONO}$ values were used as an index for changes in ventricular preload. Linear regression and Bland-Altman analyses were performed to determine the accuracy of the first heart sound frequency $f_{s1}$, $GEDV_{PICCO}$, and PAOP referenced to $EDV_{SONO}$. In order to perform a comparison of how well different measurements with different units (Hz, ml, and mmHg) correlated with $EDV_{SONO}$ (ml), the relative percentage change in the parameter values from baseline were also assessed and correlated.

The preload parameters estimated using the implanted accelerometer was subsequently used to continuously monitor the patient's Frank-Starling relation. $SV_{SONO}$, as a measure of cardiac function, was correlated with the estimated preload determined using the implanted accelerometer in order to produce a Frank-Starling curve. The produced curve allowed for comparison with Frank-Starling curves derived using different sensor modalities.

The estimated preload parameters were also used in monitoring and assessing fluid responsiveness of the heart. In the assessment of fluid responsiveness a threshold value for stroke volume variation (SVV) was set as 11.6% as has been previously been determined in the art. Using $SVV_{SONO}$ as reference, the accuracy of the accelerometer based method to correctly identify the fluid responsiveness was investigated and compared with PiCCO™ based measurements and pulmonary artery occlusion pressure. A receiver operating characteristics (ROC) analysis was performed, and the area under the ROC curve (AUC) for each method was used to assess and compare their accuracies.

All statistical analyses were performed using R (v3.5.1), developed by Foundation for Statistical Computing. A total of fifteen experiments were conducted. Six experiments were excluded due to either equipment malfunction (n=2), fatal bleeding due to left atrial rupture (n=1), or ventricular fibrillation (n=3). To test for significant effects of the volemic interventions in Table 1 (see below) students T-test was used. Normality of distributions was determined using Shapiro-Wilks test. To test differences in the area under two receiver operating characteristic curves (AUC) we used DeLong's test. Significance was determined as p≤0.05.

Results

Table 1 below sets out the results determined from the above nine experiments. The results from experiments carried out on one animal were excluded from the results given in Table 1 since it did not reach a state of overloading during fluid loading. Three columns are presented in Table 1, showing the baseline hemodynamic variables, the variables determined after maximum fluid loading of the heart, and the variables determined after maximum fluid unloading. The values in Table 1 are reported as mean (SD). *: p<0.05 vs baseline using paired sample t-test. The acronyms set out in Table 1 are as follows: EDV—end diastolic volume; SV—stroke volume; CO—cardiac output; EF—ejection fraction; SW—stroke work; SVV—stroke volume variation; $f_{s1}$[x, y, z, avg]—first heart sound frequency; GEDV—global end-diastolic volume; PPV—pulse pressure variation; MAP—mean arterial pressure; CVP—central venous pressure; HR—heart rate; SvO2—venous oxygen saturation; PAOP—pulmonary artery occlusion pressure. As noted, one animal was excluded from this table as it did not reach a state of overloading since unloading was performed before loading.

The $EDV_{SONO}$ changed significantly both at maximum loading and maximum unloading. So did $SV_{SONO}$, $CO_{SONO}$, $EF_{SONO}$, $SW_{SONO}$ and $SVV_{SONO}$. The first heart sound frequency $f_{s1}$, measured using the accelerometer, showed a significant decrease for all axes (x, y, and z) in addition to the average, during maximum volume unloading. The first heart sound frequency $f_{s1}$ showed a significant increase for x and z axes, as well as the average, during maximum volume loading, but not for the y-axis. The PiCCO based parameters ($GEDV_{PICCO}$, $SV_{PICCO}$, $CO_{PICCO}$, $SVV_{PICCO}$, $PPV_{PICCO}$) all showed a significant change during both unloading and loading. Pulmonary artery occlusion pressure did not significantly change for either extreme.

TABLE 1

|  |  | Baseline | Fluid loading | Fluid unloading |
|---|---|---|---|---|
| Sonomicrometry | EDV [mL] | 112 (27) | 121 (30)* | 94 (23)* |
|  | SV [mL] | 42 (10) | 50 (14)* | 32 (9.6)* |
|  | CO [L/min] | 4.5 (1.7) | 5.3 (2.3)* | 3.6 (1.4)* |
|  | EF [%] | 38 (6.3) | 42 (7.1)* | 34 (6.1)* |
|  | SW [mL · mmHg] | 2840 (1246) | 3727 (1473)* | 1586 (837)* |
|  | SVV [%] | 16 (7.5) | 9.6 (4.0)* | 24 (9.7)* |
| Accelerometer | $f_{S1}$ x [Hz] | 83 (8.8) | 89 (13)* | 75 (7.2)* |
|  | $f_{S1}$ y [Hz] | 85 (11) | 88 (11) | 75 (8.6)* |
|  | $f_{S1}$ z [Hz] | 79 (12) | 86 (14)* | 71 (12)* |
|  | $f_{S1}$ avg [Hz] | 82 (8.7) | 88 (8.4)* | 74 (8.6)* |
| PiCCO | GEDV [mL] | 588 (80) | 624 (118)* | 483 (69)* |
|  | CO [L/min] | 4.8 (1.1) | 5.9 (1.3)* | 4.2 (1.4)* |
|  | SVV [%] | 12 (4.1) | 6.2 (1.3)* | 15 (7.5)* |
|  | PPV [%] | 15 (6.3) | 8.6 (3.8)* | 24 (6.0)* |
| Hemodynamics | MAP [mmHg] | 70 (15) | 80 (15)* | 53 (11)* |
|  | CVP [mmHg] | 11 (1.7) | 14 (3.4)* | 9.1 (1.8)* |
|  | HR [bpm] | 104 (31) | 104 (29) | 113 (32) |
|  | SvO2 [%] | 59 (9.6) | 55 (7.1) | 44 (12)* |
|  | PAOP [mmHg] | 13 (2.2) | 16 (4.2) | 12 (3.6) |

Figure 6:
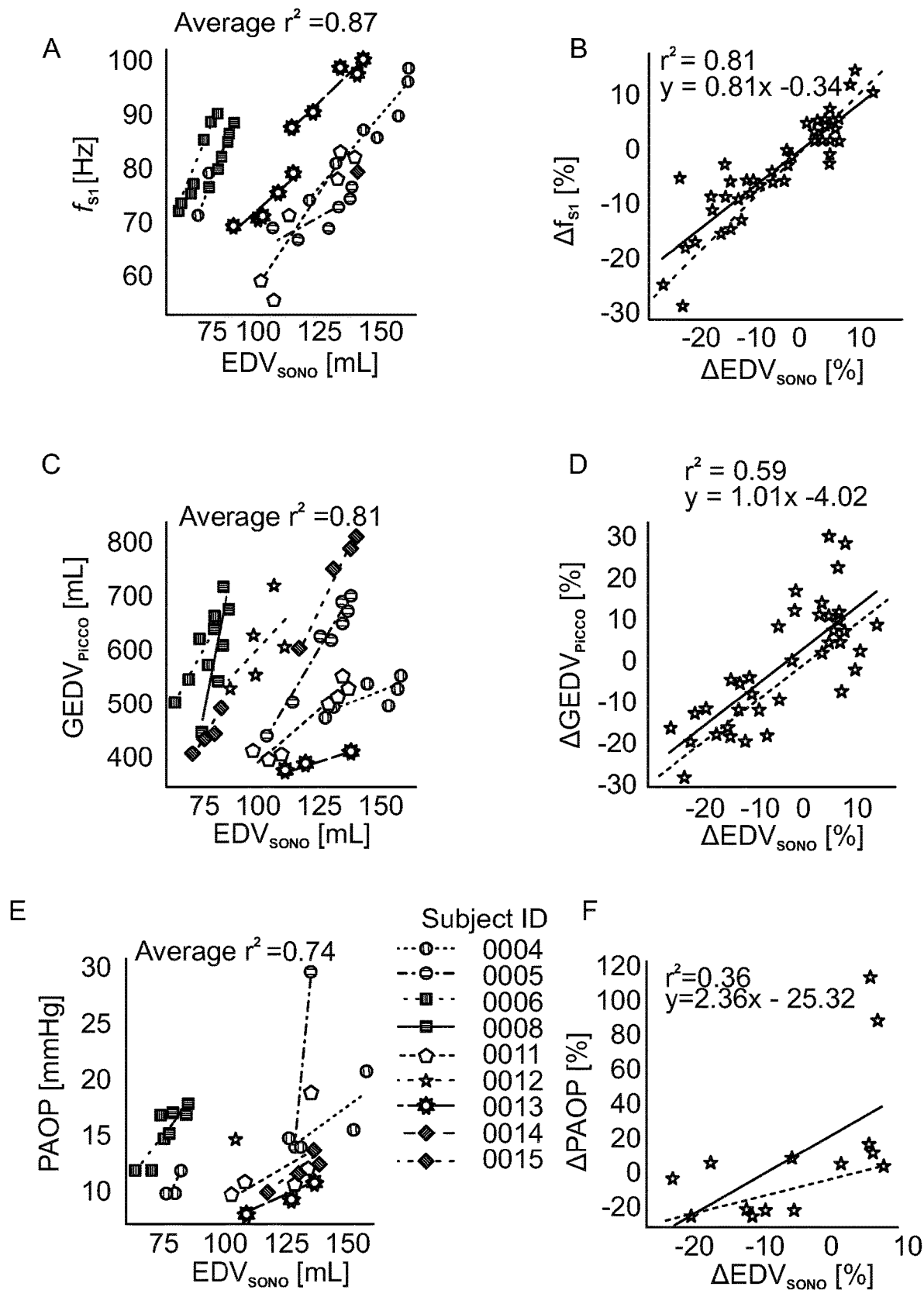
FIG. 6 shows graphical illustrations of data recorded using epicardially implanted accelerometers, intravascular PiCCO™ catheters, and from a pulmonary artery occlusion pressure analysis over time, along with regression analyses thereof.

FIG. 6 shows a graphical representation of results of the experiments carried out in the study and statistics derived therefrom. In FIG. 6, subplots A, C and E show the correlation between $EDV_{SONO}$ and $f_{s1}$, $GEDV_{PICCO}$ and PAOP, respectively for the individual pigs. Subplots B, D and F show the correlation between relative change in $EDV_{SONO}$ ($\Delta EDV_{SONO}$) and relative change in $f_{s1}$ from baseline ($\Delta f_{s1}$), relative change in $GEDV_{PICCO}$ ($\Delta GEDV_{PICCO}$) and relative change in PAOP ($\Delta PAOP$) respectively for data pooled from all experiments. In subplots B, D and F the solid black line signifies a regression line, whilst the black, stippled line signifies y=x.

Ventricular preload estimated by the first heart sound frequency $f_{s1}$ showed a very strong correlation to the reference $EDV_{SONO}$. This is shown in plot A of FIG. 6. The global end-diastolic volume ($GEDV_{PICCO}$), shown in plot C of FIG. 6, also showed a very good correlation to EDV, although with a lower average coefficient of determination ($r^2$). The PAOP had the lowest average $r^2$, shown in plot E of FIG. 6. When pooling the data for all subjects and looking at the relative change from baseline in the estimated preload parameters $\Delta f_{s1}$, $\Delta GEDV_{PICCO}$, PAOP and $\Delta EDV_{SONO}$, the correlation was stronger for $\Delta f_{s1}$ with an $r^2=0.81$, as shown in plot B of FIG. 6, than for $\Delta GEDV_{PICCO}$ (plot D) and PAOP (plot F) with $r^2$ values of 0.59 and 0.36 respectively.

Figure 7:
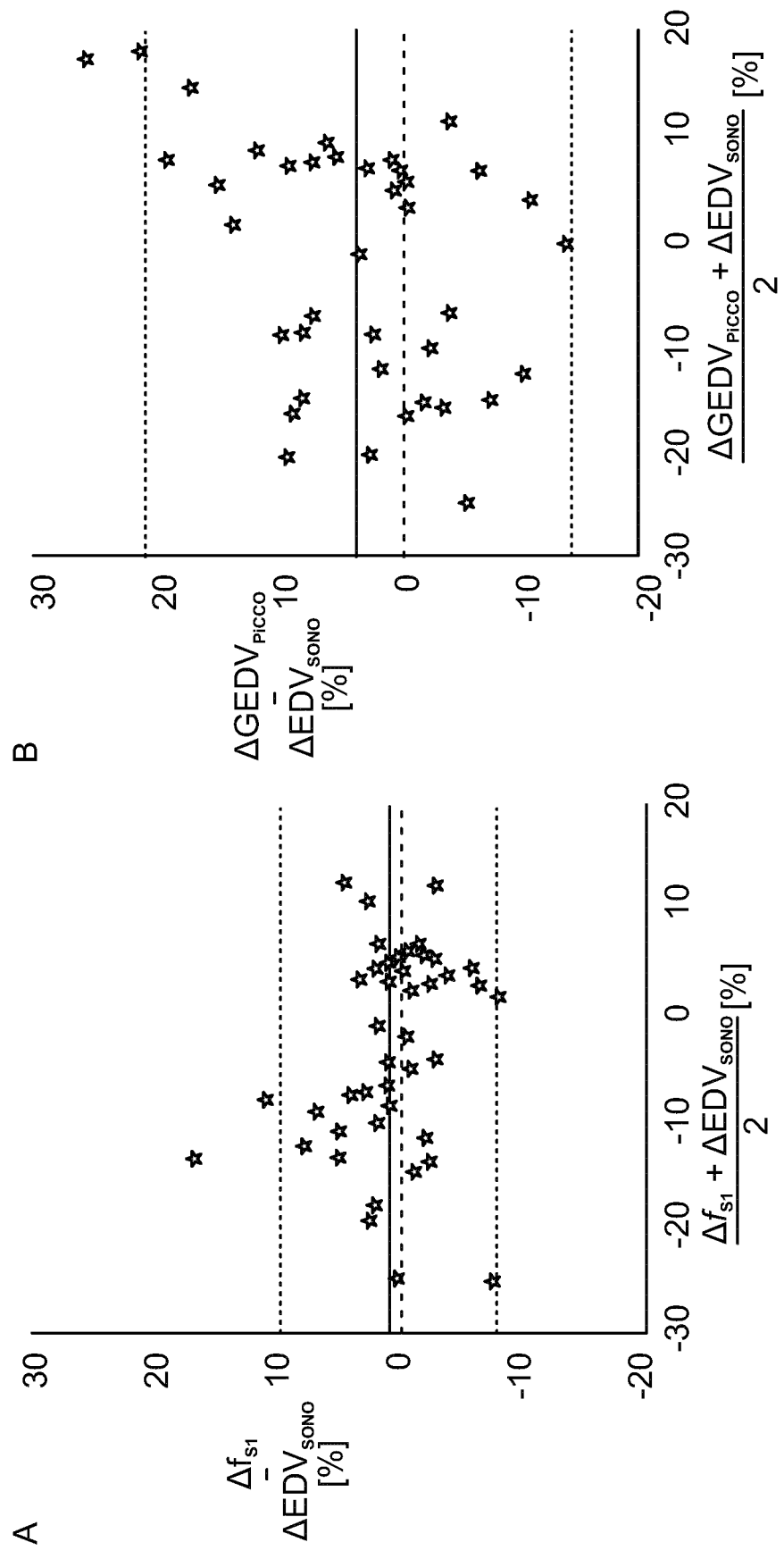
FIG. 7 shows two Bland-Altman plots representative of the agreement between data recorded with epicardially placed accelerometers and sonomicrometric measurements, and between data recorded with intravascular PiCCO™ catheters and using sonomicrometric measurements.

FIG. 7 shows two Bland-Altman plots, A and B. Plot A demonstrates the agreement between $\Delta f_{s1}$ and $\Delta EDV_{SONO}$. Plot B demonstrates the agreement between $\Delta GEDV_{PICCO}$ and $\Delta EDV_{SONO}$. The bias (1.96 SD) for $\Delta f_{s1}$ was 1.0 (8.9) %. The bias (1.96 SD) for $\Delta GEDV_{PICCO}$ was 4.0 (17.5) %. The plots are based on data pooled from all experiments. Black, solid lines signify bias, red lines signify bias±1.96 SD.

As can be seen in FIG. 7, the Bland-Altman analysis showed that the bias of $f_{s1}$ compared to the EDV was 1.0% with limits of agreement at −7.9 and 10.0%. The mean bias, and spread, for GEDV were higher than for $f_{s1}$, though not significantly (p=0.11, paired sample t-test), having a value of 4.0% and limits of agreement at −13.6 and 21.5%.

Figure 8:
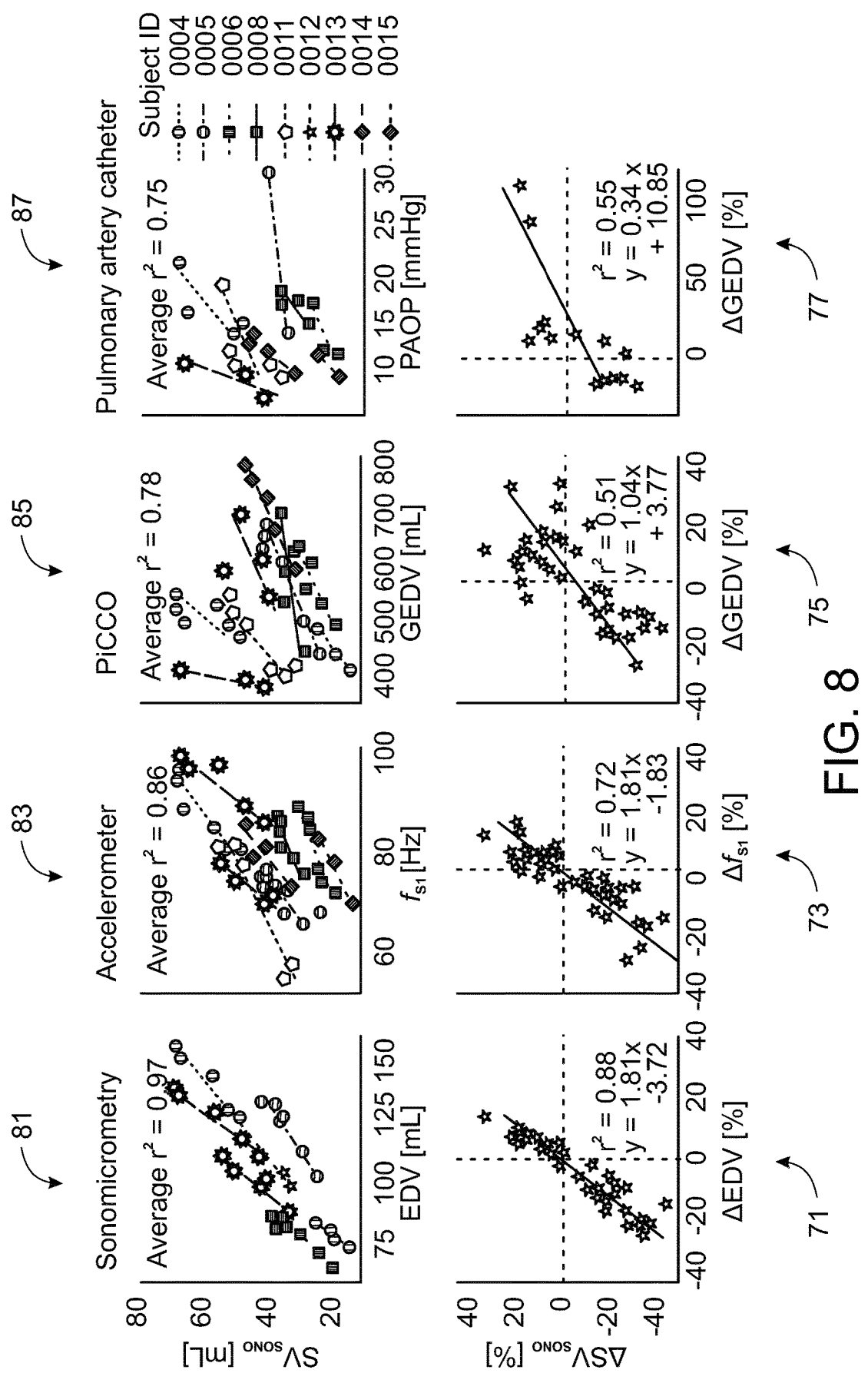
FIG. 8 shows graphical illustrations of Frank-Starling relations derived from epicardially implanted accelerometers and other modalities.

FIG. 8 shows the estimated Frank-Starling relation using the reference $SV_{SONO}$, and the results determined for EDV, the accelerometer derived index for preload $f_{s1}$, $GEDV_{PICCO}$ and PAOP. The results from the linear regression analysis assessing the correlation between $SV_{SONO}$ and $EDV_{SONO}$ (plot 81), the estimated preload parameters $f_{s1}$ (plot 83), $GEDV_{PICCO}$ (plot 85), and PAOP (plot 87) are also shown as solid lines for each pig. The average $r^2$ over all pigs for each plot 81, 83, 85, 87 is also shown.

As can be seen in plot 83, there was a very strong correlation between $SV_{SONO}$ and $f_{s1}$, which was stronger than for $GEDV_{PICCO}$ as shown in plot 85, when assessing the average correlation coefficient for individual animals. The correlation between $SV_{SONO}$ and $GEDV_{PICCO}$ was in turn stronger than for PAOP shown in plot 87. The pooled results, based on relative changes of $EDV_{SONO}$, $f_{s1}$, $GEDV_{PICCO}$ and PAOP from baseline, are also shown in FIG. 8 as plots 71, 73, 75 and 77 respectively. The correlation to stroke volume for $f_{s1}$ was stronger than for PAOP, which in turn was stronger than $GEDV_{PICCO}$.

Figure 9:
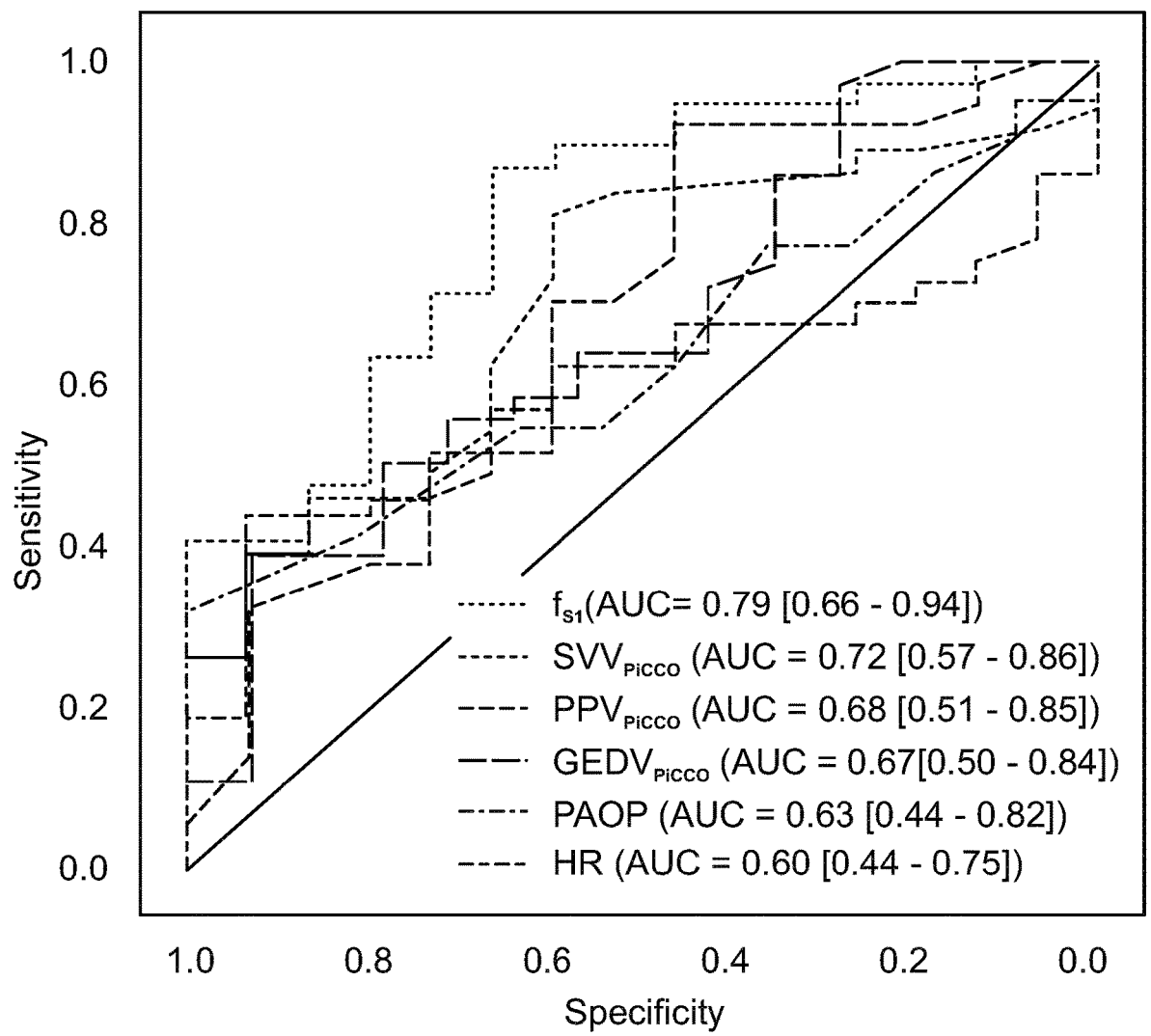
FIG. 9 shows a graphical illustration of a receiver operating characteristics analysis performed on data recorded using epicardially implanted accelerometers and other modalities.

FIG. 9 is a plot showing ROC curves for $f_{s1}$ (red trace), $SVV_{PICCO}$ (gold trace), $PPV_{PICCO}$ (light green trace), $GEDV_{PICCO}$ (dark green trace), PAOP (blue trace) and heart rate (HR— purple trace) for identifying the measurements where the SVV values determined by sonomicrometry were above 11.6% which, as noted above, was used as the indicator for fluid responsiveness. The areas under each curve (AUC values) for the different predictors are also shown.

As shown in FIG. 9, the AUC-value was highest for $f_{s1}$ but the difference was not statistically significant compared to $SVV_{PICCO}$ (p=0.21), $PPV_{PICCO}$ (p=0.09), $GEDV_{PICCO}$ (p=0.23), or PAOP (p=0.10). There was only a statistically significant difference as compared to heart rate (p=0.01). The sensitivity and specificity for $f_{s1}$, choosing the optimal cut-off value from the ROC analysis, was 87 and 67%, respectively. For $SVV_{PICCO}$, $PPV_{PICCO}$, $GEDV_{PICCO}$, PAOP, and heart rate the sensitivities and specificities were, 81 and 60%; 70 and 60%; 56 and 71%; 55 and 64%; and 57 and 67%, respectively.

The foregoing discussion is evidence of the inventors' realisation that motion of the heart can be used to monitor changes and estimate a value associated with tension in the heart wall (i.e. in form of ventricular preload). In particular the foregoing discussion demonstrates that changes in ventricular preload can be monitored by an accelerometer attached to the epicardium by virtue of an assessment of the changes in the first heart sound frequency ($f_{s1}$).

Further, the foregoing discussion shows a strong correlation between the frequency of the myocardial vibrations associated with the first heart sound $f_{s1}$ with EDV and myocardial stiffness. Thus, monitored heat wall motion, in particular vibrations at end diastole/start systole etc., can be used to monitor a volemic state of a patient continuously and in real time. Hence, advantageously an accelerometer placed, for example, epicardially may be used to monitor a patient's volemic state post-operatively.

It has also been demonstrated that the accelerometer-based measurements as presented herein for the estimation of ventricular preload and identifying fluid responsiveness are comparable to the current clinical standard methods, e.g. PiCCO™ and PAOP.

Furthermore, since the miniaturized accelerometer used as the basis of the study presented herein may be incorporated in a temporary pace lead, which is routinely placed on open heart surgery patients, the methods presented may not require an additional procedure (e.g. as in the case of PiCCO systems) for the assessment and monitoring of a value associated with tension in the heart wall (e.g. preload) and/or a volemic state of the heart. They can instead rely on equipment which has already been implanted at the heart for a different purpose. This is clearly advantageous in respect of patient safety.

The use of an implanted accelerometer as presented above ensures that contact with the blood stream is avoided.

Both the accelerometer based method as detailed above and the prior art PiCCO™ systems allow for a continuous measure of hemodynamic values. However, PiCCO™ systems are dependent on a thermodilution calibration and will drift based on vascular compliance and must therefore be recalibrated when changes in vascular compliance occur. In addition, the accuracy and precision of PiCCO™ based monitoring will also be affected by aortic valve regurgitation and over- or under-damped arterial pressure waveforms. As the accelerometer based method as presented above, and indeed alternative methods (e.g. those reliant on variations in heart wall motion) encompassed within the scope of the present invention, are reliant on an identification of heart wall motion, and are not dependent/reliant on pressure waveforms, the accuracy and precision of such methods should not be affected by the aforementioned conditions.

Combined with a measure of heart function, like peak systolic velocity, pressure-displacement loop area or others, it is also clear that a robust estimate of a patients position on the Frank-Starling curve can be determined based on the ventricular preloads estimated using methods in accordance with the aspects of the invention. This was reflected in the results of the linear regression analysis, assessing the correlation of the preload parameters to stroke volume. The correlation between $SV_{SONO}$ and $f_{s1}$ was stronger than both the clinically available measures $GEDV_{PICCO}$ and PAOP, when assessing both the individual and the pooled data. The PiCCO also showed large variation in the slopes of the individual regression lines, while the slopes for $f_{s1}$ were more aligned, which suggests that accelerometer based measurements may be less susceptible to inter-subject variability.

The above described methods have also been shown to be capable of predicting fluid responsiveness, which is of significant importance as fluid resuscitation is the first line of defence in critically ill patients. It is shown above that the diagnostic accuracy (area under the ROC curve) for identifying fluid responsiveness using $f_{s1}$ (i.e. using the epicardially implanted accelerometer) was comparable to $SVV_{PICCO}$ and $PPV_{PICCO}$ methods and thus the methods of the invention are at least comparable to prior art systems when it comes to determining fluid responsiveness.

Furthermore, since at least the exemplary method of the invention that is reliant on vibrations in the heart wall as set out in the above discussion is not reliant on mechanical ventilation of a patient, such methods should prevail in predicting fluid responsiveness over SVV measured using traditional PiCCO™ systems in in open chest conditions, in patients on pressure support ventilation, during pericardial effusion, etc. (i.e. in conditions under which there is no, or artificially altered, mechanical ventilation of the patient).

Additionally, since the methods of the invention as disclosed herein are reliant on identified motion in the heart, such methods most likely not be affected by complications in the peripheral system, like peripheral vascular disease and thus can be used in the hemodynamic assessment of patients with arrhythmias, valvular disease, intracardiac shunts, peripheral vascular disease and decreased ejection fraction, which prior art systems, such as PiCCO™ systems reliant on SVV cannot.

As noted above, whilst the above exemplary embodiment of the invention is in the context of estimating ventricular preload, the invention is not limited as such. This is demonstrated for example by the frequency spectrum in panel 43 of FIG. 6. As will be appreciated from the above discussion, this frequency spectrum can be seen as a surrogate for tension in the myocardium across the whole heart cycle. Thus, tension in the myocardium (and associated parameters) can be estimated for any point within the heart cycle. For instance, at around 0.5-0.55 s of panel 43 it can be seen there are two peaks at the end of systole. These peaks will likely represent the contractility of the myocardium and as such the invention may comprise estimating contractility. The frequency spectrum is a continuous measure and may represent many different physiological parameters of the heart at different timepoints.

The invention claimed is:

1. A method of estimating a tension value in a heart wall, the method comprising:
   receiving motion data recorded with a sensor in communication with a heart;
   determining a frequency of a vibration in the heart wall based on the motion data; and
   estimating the tension value based on the frequency of the vibration in the heart wall,
   wherein the vibration in the heart wall is inherent to the heart as part of normal function of the heart, and
   wherein the step of estimating the tension value uses a square-law estimation.

2. The method of claim 1, wherein the vibration in the heart wall results from an opening and/or closing of at least one of a mitral valve, an aortic valve, a pulmonary valve or a tricuspid valve, or wherein the vibration in the heart wall results from contraction and expansion of the heart.

3. The method of claim 1, wherein the sensor comprises at least one of: an accelerometer, a magnetometer, or a gyro.

4. The method of claim 1, wherein the sensor is an invasive sensor implanted at the heart, such as at an epicardium of the heart, an endocardium of the heart, and/or a myocardium of the heart.

5. The method of claim 4, wherein the sensor is comprised within a pacemaker lead positioned at the heart.

6. The method of claim 1, wherein the sensor is a non-invasive sensor, such as a sensor based on computed tomography, echocardiography, magnetic resonance imaging, or radar.

7. The method of claim 1, wherein the motion data is recorded in real-time such that the estimating the tension value is a real-time estimation.

8. The method of claim 1, wherein the step of estimating the tension value based on the frequency of the vibration in the heart wall comprises repeatedly estimating a tension value over a period of time covered by the recorded motion data such that dynamic changes in the tension value can be assessed.

9. The method of claim 1, further comprising estimating a volemic state of the heart based on the tension value.

10. The method of claim 1, wherein the tension value is a tension in the heart wall.

11. The method of claim 10, further comprising: estimating a ventricular preload based on the tension in the heart wall.

12. A method for producing a patient specific Frank-Starling curve, the method comprising:
carrying out the steps of the method as defined in claim 11 such that an estimate of ventricular preload is obtained;
obtaining a measurement of patient cardiac function contemporaneous with the estimate of ventricular preload; and
producing a patient specific Frank-Starling curve based on the measurement of patient cardiac function and the estimate of ventricular preload.

13. The method of claim 12, wherein the measurement of cardiac function is measured using motion data recorded with the sensor in communication with the heart.

14. The method of claim 1, further comprising:
calculating an estimated ventricular preload based on the frequency of the vibration in the heart wall.

15. A computer program product comprising instructions that, when executed, will configure a data processing apparatus to perform the method of claim 1.

16. The method of claim 1, further comprising using the tension value in the heart wall to estimate an additional value associated with the tension in the heart wall.

17. A heart monitoring system comprising:
a sensor configured to be placed in communication with a heart in order to determine a frequency of a vibration in a heart wall, wherein the vibration in the heart wall is inherent to the heart as part of normal functioning of the heart; and
a data processing device arranged to:
receive motion data from the sensor;
determine the frequency of the vibration in the heart wall from the motion data, wherein the vibration in the heart wall is inherent to the heart as part of the normal functioning of the heart; and
estimate a tension value based on the frequency of the vibration in the heart wall, wherein the data processing device is configured to estimate the tension value using a square-law estimation.

18. The heart monitoring system of claim 17, wherein the sensor comprises at least one of: an accelerometer, a magnetometer, or a gyro.

19. The heart monitoring system of claim 17, wherein the sensor is an invasive sensor configured to be implanted at the heart, such as at an epicardium of the heart, an endocardium of the heart, and/or a myocardium of the heart.

20. The heart monitoring system of claim 19, wherein the sensor is comprised within a pacemaker lead that is configured to be positioned at the heart.

21. The heart monitoring system of claim 17, wherein the sensor is a non-invasive sensor, such as a sensor based on computed tomography, echocardiography, magnetic resonance imaging, or radar.

* * * * *

UNITED STATES PATENT AND TRADEMARK OFFICE
CERTIFICATE OF CORRECTION

PATENT NO. : 12,502,083 B2  
APPLICATION NO. : 17/781169  
DATED : December 23, 2025  
INVENTOR(S) : Krogh Page 1 of 1

It is certified that error appears in the above-identified patent and that said Letters Patent is hereby corrected as shown below:

On the Title Page

Column 2, Item (57), under "ABSTRACT", Line 7, delete "heat" and replace with --heart--.

In the Claims

In Column 21, Claim 11, Lines 19-21, delete "estimating a ventricular preload based on the tension in the heart wall." and replace with the same at Line 20, as a new sub-point.

Signed and Sealed this  
Third Day of February, 2026

John A. Squires  
*Director of the United States Patent and Trademark Office*